US008189895B2

(12) United States Patent
Ruijters

(10) Patent No.: US 8,189,895 B2
(45) Date of Patent: May 29, 2012

(54) FUSED PERFUSION AND FUNCTIONAL 3D ROTATIONAL ANGIOGRAPHY RENDERING

(75) Inventor: Daniel Simon Anna Ruijters, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 471 days.

(21) Appl. No.: 12/514,457

(22) PCT Filed: Nov. 9, 2007

(86) PCT No.: PCT/IB2007/054559
§ 371 (c)(1),
(2), (4) Date: May 12, 2009

(87) PCT Pub. No.: WO2008/059417
PCT Pub. Date: May 22, 2008

(65) Prior Publication Data
US 2010/0290681 A1    Nov. 18, 2010

(30) Foreign Application Priority Data

Nov. 13, 2006   (EP) ..................................... 06123944

(51) Int. Cl.
*G06K 9/00*   (2006.01)
(52) U.S. Cl. ........................................................ 382/131
(58) Field of Classification Search .................. 382/131, 382/154
See application file for complete search history.

(56) References Cited

U.S. PATENT DOCUMENTS

| 6,879,711 B2* | 4/2005 | Maurincomme et al. ..... 382/128 |
| 2005/0010099 A1 | 1/2005 | Raabe et al. |
| 2005/0245807 A1 | 11/2005 | Boese et al. |
| 2008/0278489 A1* | 11/2008 | Mielekamp ................... 345/424 |
| 2008/0304615 A1* | 12/2008 | Mielekamp ....................... 378/4 |

FOREIGN PATENT DOCUMENTS

| WO | 2006018774 A1 | 2/2006 |
| WO | WO 2007054863 A1 * | 5/2007 |

OTHER PUBLICATIONS

Ruijters et al: "Silhouette Fusion of Vascular and Anatomical Volume Data"; Biomedical Imaging:Macro to Nano, 2006, IEEE International Symposium Apr. 6, 2006, pp. 121-124.*

Manzke et al: "Intra-Operative Volume Imaging of the Left Atrium and Pulmonary Veins With Rotational X-Ray Angiography"; Medical Image Computing and Computer-Assisted Intervention-MICCAI 2006 Lecture Notes in Computer Science (LNCS), vol. 4190, pp. 604-611.*

* cited by examiner

*Primary Examiner* — Roy M Punnoose

(57) ABSTRACT

A Method and system for visualising information by combining 3DRA with diagnostic data like regular CT or MR, and colorized physiologic data like perfusion or functional data to obtain a plurality of volumes obtained from the same patient. These volumes may be a 3DRA volume, a regular greyscale CT or MR volume and a colorized physiologic parameter like a perfusion CT, a perfusion MR or a functional MR volume. Then, an anatomic structure like a vessel is segmented from the 3DRA volume, a slab out of the regular CT or MR data is rendered through the segmented vessel, and a slice out of the colorized volume of the perfusion or functional data is rendered on top of the slab.

20 Claims, 5 Drawing Sheets

FUSED PERFUSION AND FUNCTIONAL 3D ROTATIONAL ANGIOGRAPHY RENDERING

TECHNICAL FIELD

The present invention relates to a system and method for rendering images/views of an anatomical structure, e.g. vessel structures. In particular, the present invention relates to a system and method for registering an image of a 3D X-ray rotational angiography (3DRA) with a scan of physiologic data, e.g. from a computer tomography (CT) or magneto resonance (MR) scan, to yield a combined image or view thereof.

BACKGROUND ART

Interventional X-ray angiography procedures are generally based on real time, two-dimensional (2D) minimally invasive image guidance of endovascular material through the vasculature or the human vessels. The imaging modality of choice for the interactive tracking of guide wires and catheters is an X-ray angio machine. Typically, interactive tracking of such endovascular material, e.g. a guide wire and/or catheter, have been achieved with an X-ray angiography instrument. Recently introduced three-dimensional rotational angiography (3DRA) techniques have significantly improved upon standard 2D angio imaging techniques by adding a third imaging dimension. A 3DRA imaging allows for a better understanding and assessment of the vessel morphology, as well as the mutual relationship of vessel pathology and surrounding branches.

In many clinical procedures, a diagnostic scan of the relevant anatomical region has already been obtained, e.g. using conventional CT and/or MR technology. Thus, the diagnostic scan information is frequently available for a patient who is undergoing a minimally invasive, interventional treatment. The potential for combining the CT or MR data set with the 3DRA data set, i.e. image fusion, has been investigated. However, to maximise the potential benefit to clinicians and other personnel, image fusion systems should be designed to present two independent data sets in such a way, that the combined image is easy to interpret and manipulate, while offering at the same time a maximum of clinically relevant information.

Prior approaches to image fusion has involved a presentation that combines 2D cross sections of two data sets. This presentation mode is not ideal, because it is impossible for a clinician to interpret the 3D morphology of a vessel from a 2D cross section. For the optimal usage of such combinations it is of importance that all the data encapsulated in the separated data sets are easily accessible, without cluttering the screen with an abundance of data. Further, it is of importance that the spatial relationship between the different data sets is clearly presented.

D. Ruijters et al. describes "Silhouette Fusion of Vascular and Anatomical Volume Data" in International Symposium on Biomedical Imaging (ISBI), pp. 121-124, Washington D.C., USA, April 2006. In this conference paper, a method is described for a combined hybrid visualisation of cerebral blood vessels, segmented from a 3D rotational angiography data set, and data sets containing the soft tissue anatomy, such as CT or MR. The paper describes a combined visualisation of the cerebral blood vessels, segmented from 3DRA data sets and data sets containing the surrounding anatomy, obtained from CT or MR.

Further, U.S. Pat. No. 6,879,711 B2 describes a method for automatic registration of three-dimensional images, wherein the visualisation of the blood vessels can be obtained by the comparison of a three-dimensional digital image obtained by means of a radiology apparatus and a three-dimensional digital image obtained by means of a nuclear magnetic resonance apparatus.

SUMMARY OF THE INVENTION

It is an object of the present invention to provide an improved fused visualisation of obtained data without cluttering the screen with an abundance of data.

The invention provides a method and device for registering an image, a system for registering an image, a corresponding programme element and a computer readable medium.

It should be noted that the following described exemplary embodiments of the invention apply also for the method, the device, the programme product and the computer readable medium.

According to an exemplary embodiment of the present invention, a method for registering an image comprises obtaining a 3D rotational angiography data set of an anatomical structure, obtaining a physiologic data set relating to a physiologic parameter with respect to the anatomic structure, generating a first image that includes the anatomical structure and is derived from the 3D rotational angiography data set, generating a second image that includes the physiologic parameter and is derived from the physiologic data set, and registering the first image and the second image.

For interventional treatment and treatment planning of vessel pathologies it may be of interest to combine physiologic data like perfusion or functional data, obtained by for example perfusion computer tomography, perfusion magneto resonance or functional magneto resonance, with segmented vessels obtained from a 3D rotational angiography. Combining the physiologic information in for example perfusion CT or MR, obtained before an intervention, with 3DRA which is obtained during an intervention, as well as combining functional MRI with 3DRA opens up the possibility for a whole range of new treatments, e.g. very localised radiotherapy of tumours, etc. Thus, it is possible to provide a special, easy to interpret rendering and presentation mode to allow to display a single slice of e.g. functional or perfusion data, the segmented vessels as well as the intersection thereof. The method offers the possibility to provide the clinician with a maximum amount of information without compromising the ease of use and interpretation. The combined presentation mode allows completely new treatment approaches of complex vascular pathologies.

It should be noted that an anatomical structure may be, for example, a vessel, a vessel tree or a vasculature. Such anatomical structure can be obtained by using a contrast medium, when injected in the vessel to assure that the intensities of the vessel voxels in a 3DRA volume are much higher than the other voxel intensities.

Physiologic data may be, for example, the perfusion of an anatomic structure, its environment or any other tissue (hard and soft), as well as, for example, functional data of the anatomic structure (vessels etc), its environment and any other tissue. A perfusion scan can, for example, be performed in order to determine whether poor blood flow (ischemia) is present in order to evaluate the location and amount of permanent damage caused by a stroke, and to help to determine whether a person should be treated with angioplasty, and check for adequate blood flow after catheterisation. It should be noted that functional data may, for example, include a haemo-dynamic response related to a neutral activity, e.g. in the brain or the spinal cord. Such a functionality can be measured, for example, by the functional magneto-resonance imaging (fMRI).

Generating an image can be understood as the processing of the data obtained by an examination apparatus, for example, a 3D rotational angiography apparatus. The data have to be processed to obtain an image allowing to interpret the data, for example, with respect to the location and intensity of a pixel. The generated image allows to analyse the data with respect to structures present in the image. It should be noted that generating an image does not inevitably include the visualization of an image, for example, on a screen or by means of a printer. Moreover, generating means to provide a relation of the pixels or voxels, which have to be analysed. An image may comprise information of a plurality of dimensions.

Registering of an image may include to analyse the images with respect to structures spatially corresponding to each other so that registering allows to provide positions of the images in relation to each other.

According to an exemplary embodiment of the present invention, the method comprises obtaining a diagnostic data set relating to an anatomical region, generating a third image that includes the anatomical region and is derived from the diagnostic data set, and registering the first image, the second image and the third image.

For increasing the overview a diagnostic scan of an corresponding anatomic region may be added, obtained by for example computer tomography (CT), magneto resonance (MR). An improved interpretation of a rendering and presentation mode can be achieved by displaying, for example, a slab out of a diagnostic scanning, and the intersection thereof with a slice of a functional or perfusion data and segmented vessels. Thus, it is possible to generate a presentation assuming three volumes, obtained from the same patient to be present, a 3DRA volume of an anatomical structure, a regular computer tomography or MR volume of an anatomical region, and a perfusion computer tomography, perfusion magneto resonance, functional magneto resonance volume and the like. Although the physiologic data may be visualized as a slice, the data source thereof may include data relating to a volume. The volume data then have to be converted into plane data by interpolating the data on an plane intersecting with the data volume.

It should be noted that an anatomical region may be a volume of any tissue, and may also include an anatomical structure. The anatomical region normally is acquired by a computer tomography or magneto resonance imaging, preferably without a contrast medium in order to provide the structure of the anatomical region of the patient to be examined. By combining the visualization of an anatomical structure, visualizing very exact and contrasting due to the contrast medium, e.g. a vessel, and an anatomical region visualizing with a lower contrast, e.g. the tissue and organs in the environment of the anatomical structure, it is possible to obtain a good overview of the anatomical structure of interest and its contextual environment. This is of particular interest when combining the information obtained before an intervention, like the data for the anatomical region, and data obtained during an intervention, for example, a visualization of a vessel. This is of particular importance when treating a patient having an ischemic stroke, a stenosis, an aneurism and the like.

According to an exemplary embodiment of the present invention, the method comprises segmenting the 3D rotational angiography data set in order to segment, for example, a vessel, a vessel tree or a vasculature.

According to an exemplary embodiment of the present invention, the method comprises generating a triangulated mesh from the segmented 3D rotational angiography data set.

Based on the segmented data set and the generated triangular mesh based thereon, the visualization may be carried out by means of standard 3D functionalities like OpenGL and DirectX.

According to a further exemplary embodiment of the present invention, the method comprises blending a slab of the third image and a portion of the first image using volume rendering.

The volume rendered data can be mixed with the triangulated mesh by using information in the depth buffer concerning the triangulated mesh and traversing the volume rendering integral from back-to-front.

According to a further exemplary embodiment of the present invention, the physiologic parameters are visualized as a slice in a visualized image.

According to an exemplary embodiment of the present invention, the method comprises obtaining a diagnostic data set relating to an anatomical region and generating a third image that includes the anatomical region and is derived from the diagnostic data set, wherein the slice is visualized on top of a slab of the third image.

According to an exemplary embodiment of the present invention, the physiologic parameter is visualized as a colourised image, wherein the colourised image indicates measures of the physiologic parameter by modifying a colour and/or the intensity of a colour.

Physiologic parameters may be perfusion data and functional data. The perfusion data can be presented in a colourised image, whereby the colour index can indicate a number of measures, e.g. blood volume, blood flow, mean transit time, average peak time, etc. Further, the functional data resulting, for example, from a functional magnetic imaging, can be presented in a colourised image on top of a regular magneto-resonance image, whereby the colour index indicates the amount of neural activity.

Additionally to the data types described above, the invention uses regular CT or MR data for representation of the anatomy of the patient. The invention therefore provides an optimum presentation of the large amount of data that is the result of combining 3DRA with diagnostic data (like regular CT or MR) and colourised data (like perfusion or functional data).

An exemplary fused perfusion/functional 3DRA rendering, or more generalised a fused physiologic 3DRA rendering may be performed as follows. A vessel is segmented from a 3DRA volume. Instead of a vessel, also a vessel tree or a vasculature or any other anatomic structure may be segmented. Injecting a contrast medium in the vessel or in general to the anatomic structure assures that the intensity of the structure voxels of interest in the 3DRA volume are much higher than the other voxel intensities not belonging to the anatomical structure. Thus, the contrast can be increased to provide a clear visualization of the anatomical structure. Then a triangulated mesh is obtained from the segmented data, wherein the mesh is drawn to a frame buffer. Simultaneously, depth information is written into the depth buffer. This can be done by using a standard 3D functionality, like OpenGL or DirectX. Subsequently a slab of the computer tomography or magneto resonance data is blended using volume rendering. The volume rendering data can be mixed with a triangulated mesh by using the information in the depth buffer and traversing the volume rendering integral from a back-to-front. The position of the slab, its orientation, its width and its transparency can be changed for an optimum visualization. Then a single slice of a colourised volume is drawn on the top of the slab. Colourising the volume provides a good orientation for the user and a clear and structured overview of the region of interest. The red, green, blue (RGB) values of the slice can be obtained by tri-linear interpolation of the plane corresponding with the top of the slab and the colourised volume. The colour values have to be blended with the slab. The blending process can be driven by an opacity value alpha ($\alpha$). The opacity alpha ($\alpha$) can be (but must not be) determined by the following formula.

$$\alpha = \max(0, \min(1, \text{constant} * \text{sqrt}(r^2 + g^2 + b^2))), \text{ whereby constant can be varied.}$$

The opacity driven blending of the existing pixel values generated by visualizing the slab in the frame buffer, and the interpolated colour values of the plane can be described as:

$$\text{RGB index output} = \alpha * \text{RGB}_{plane} + (1-\alpha) * \text{RGB}_{frame\ buffer}.$$

According to an exemplary embodiment, alternatively the blending can be performed by adding the values of frame buffer and the colourised plane per colour channel, without the use of a opacity (alpha) value.

The information in the depth buffer is used for blending with the triangulated mesh. If, for a given pixel, the mesh is in front of the plain, the pixel is not overwritten, otherwise the new value is determined by the blending process.

Further, it is required that the spatial relationship between the different volumes is known and correctly applied during rendering the individual volumes. Such a spatial relationship can be obtained by applying a registration algorithm.

According to an exemplary embodiment of the present invention, the physiologic data set is obtained from a diagnostic imaging system selected from the group consisting of a computer tomography imaging system, a magneto resonance imaging system and a functional magneto resonance imaging system.

According to an exemplary embodiment of the present invention, the physiologic parameters are selected from the group consisting of perfusion data of the anatomic structure, functional data of the anatomic structure, perfusion data of the environment of the anatomic structure and functional data of the environment of the anatomic structure. However, also any other appropriate physiologic parameters can be used for applying the method according to the present invention.

The technical implementation of the present invention may require existing techniques, like segmentation of the vessel from a 3DRA volume, obtaining a triangulated mesh from the segmented data, and blending triangulated meshes with volume rendering, as they are known in the art.

It may be seen as a gist of the present invention to provide a manner to visualise information by combining 3DRA with diagnostic data like regular CT or MR, and colourised physiologic data like perfusion or functional data to obtain a plurality of volumes obtained from the same patient. These volumes may be a 3DRA volume, a regular greyscale CT or MR volume and a colourised physiologic parameter like a perfusion CT, a perfusion MR or a functional MR volume. Then, an anatomic structure like a vessel is segmented from the 3DRA volume, a slab out of the regular CT or MR data is rendered through the segmented vessel, and a slice out of the colourised volume of the perfusion or functional data is rendered on top of the slab.

It should be noted that the description above also applies for a system for registering an image corresponding to the above method, a computer programme and a corresponding computer readable medium.

The present invention may be applied during minimal invasive interventional treatment of vascular pathologies and endovascular treatment of the neoplastic tissue, where it is of great clinical benefit to obtain morphological assessment of the tissue inside and surrounding the vessel. The clinical added value of the invention lies in a better orientation and understanding of the local anatomy during treatment of the ischemic strokes, stenosis, aneurism and AVMs located in the head, the localisation of bleedings caused during minimal invasive procedures very localised radiotherapy of tumours, etc. The invention can, in particular, be used in interventional X-ray angiographic procedures.

These and other aspects of the present invention will become apparent from and elucidated with reference to the embodiments described hereinafter.

BRIEF DESCRIPTION OF THE DRAWINGS

Exemplary embodiments of the present invention will be described in the following with reference to the following drawings.

DETAILED DESCRIPTION OF THE EXEMPLARY EMBODIMENTS

Figure 1:
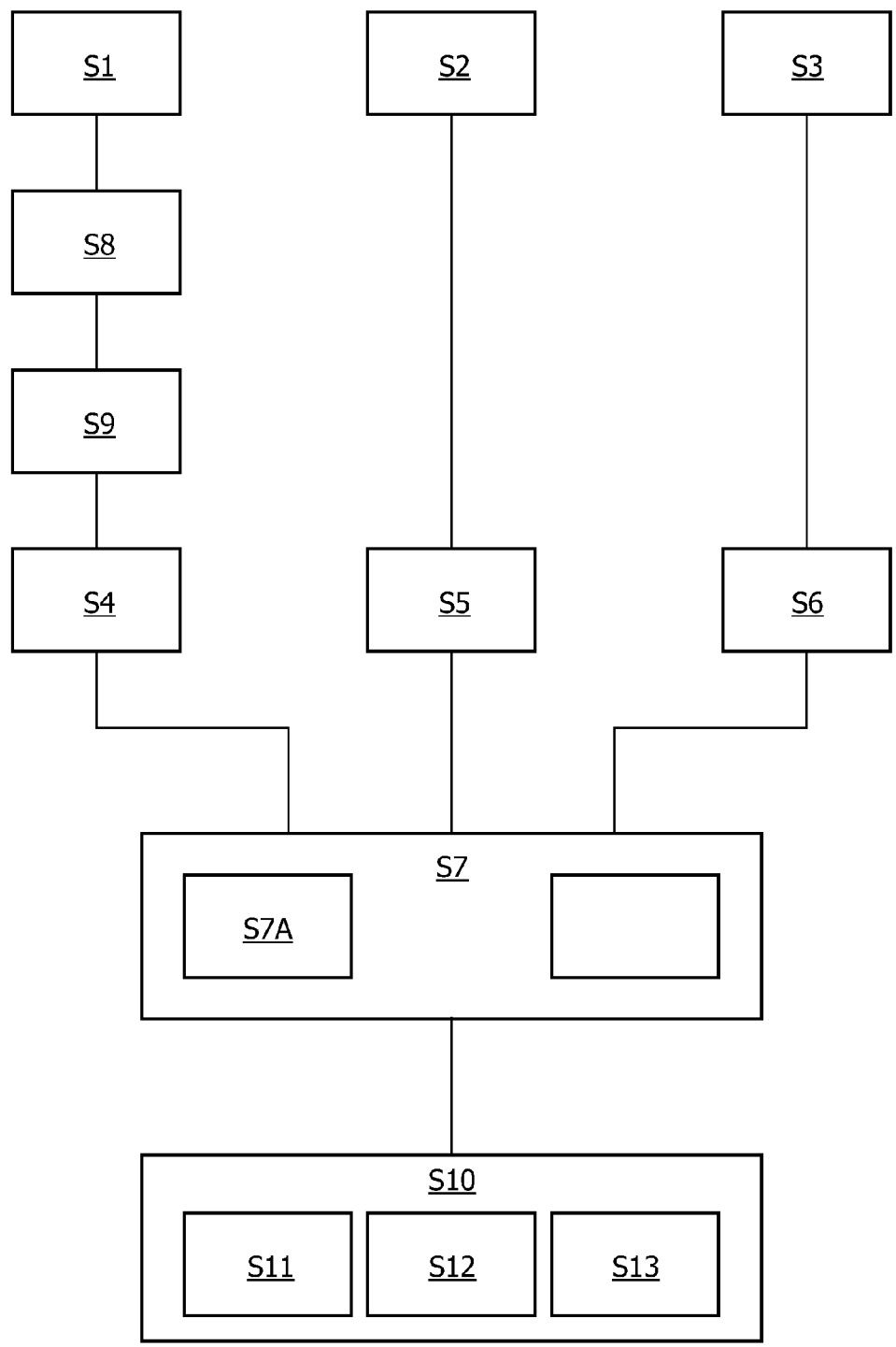
FIG. 1 shows a flow chart diagram illustrating the steps of a method of an exemplary embodiment of the present invention.

FIG. 1 shows a flow chart of a method according to an exemplary embodiment of the present invention. The method comprises obtaining a 3D rotational angiography data set of an anatomical structure S1, obtaining a physiologic data set relating to a physiologic parameter with respect to the anatomic structure S2, generating a first image that includes the anatomical structure and is derived from the 3D rotational angiography data set S4, generating a second image that includes the physiologic parameter and is derived from the physiologic data set S5, and registering the first image and the second image S7. Further, the method may comprise obtaining a diagnostic data set relating to an anatomical region S3 and generating a third image that includes the anatomical region and is derived from the diagnostic data set S6.

The generated images of the anatomical structure and the physiologic parameter, and optionally of the anatomical region are registered S7, S7a. Registering means to analyse the generated image in order to find structures in each of the registered images, which correspond to each other. If the corresponding structures are found, the images can be adapted so that the linking object of each of the images correspond to each other with respect to size, position, etc.

In other words, each of the image can be resized in each of the three dimensions and rotated until the structures of the images correspond to each other and then, if visualized, give a real impression of the anatomical structure and the physiologic parameter as well as the anatomical region.

It should be noted that the first and the second image may be registered S7, as well as the first, the second and the third image S7a.

For the purpose of visualization, for example, the 3D rotational angiography data set is segmented, and a triangulated mesh is generated from the segmented 3D rotational angiography data set. The mesh is drawn to a frame buffer, wherein simultaneously the depth information is written to the depth buffer. This can be done by using a standard 3D functionality, like OpenGL or DirectX. A slab of a CT or MR image is blended with parts of the segmented data using volume rendering. The volume rendered data can be mixed with the triangulated mesh by using the information in the depth buffer and traversing the volume rendering integral from back to front. The position from the slab, its orientation, its width and its transparency may be changed.

For the provision of the first image, the method may comprise segmenting the 3D rotational angiography data set S8 and generating a triangulated mesh from the segmented 3D rotational angiography data set S9. It should be noted that the steps S1, S8, S9, S4 do not have to be in the described or illustrated order, but may also be in a changed order, where it is appropriate.

An anatomical structure may be a vessel, a vessel tree or a vasculature, or any other anatomical structure, preferably an isolated structure of interest. In case of investigating a stroke or an aneurism such an anatomical structure is a vessel, a vessel tree or a vasculature. It should be noted that also any other structure is possible, for example, neuronal structures, particular organs, bones, respiratory tracks etc.

The physiologic parameter may be, for example, perfusion data or functional data or any other activity in the human body. The physiologic parameter indicates an activity of the human body and may further indicate also a state or a condition, like the supply of the tissue with oxygen, minerals, or the presence of concretions.

Generating an image means to convert the raw data obtained from a 3D rotational angiography machine or any other examination apparatus into a data format, which can be analysed with respect to the presence of any structures therein.

The anatomical region is a portion of, for example, the human body. It may be a slab or a thicker slice indicating the structure and the position of bones, soft tissue, organs, musculature, and the like. The anatomical structure may be a part of the anatomical region. The anatomical region may be displayed based on diagnostic data of a magneto-resonance imaging or computer tomography imaging. Preferably, the anatomical region is recorded without a contrast medium, in order to provide an information on the relation of the different portions of the anatomical region. To the contrary, the anatomical structure may be preferably visualized by using a contrast medium in order to increase the contrast and the visibility of the anatomical structure. Thus, it is possible to provide an exact and detailed information on the anatomic structure of interest, wherein the anatomical region serves for providing an overview of the surrounding region.

The method further comprises visualizing the registered images S10. Thus, the user can obtain an overview of the anatomical structure, the physiologic parameters, and optionally of the anatomic region of the patient, wherein the registered images provide an overview due to the combination of the corresponding structures.

The method may further comprise blending a slab of the third image and a portion of the first image using volume rendering S11, as described above. Further, the physiologic parameter may be visualized as a slice in a visualized image S12. In particular, the physiologic parameter may be visualized as a slice on top of a slab of the third image S13. The physiologic parameter in form of a slice may be visualized as a colourised image, wherein the colourised image indicates measures of the physiologic parameter by modifying a colour and/or the intensity of a colour. Colourising the image allows to provide a good overview of the state and the condition of the physiology. It may also be possible to provide a multicolour image, wherein each colour may represent a physiologic parameter, or wherein each colour represents a range of a single physiologic parameter. It is also possible to provide the colourised image, wherein the ranges of the measures of the physiologic parameter are allocated to a particular intensity of a colour. This also allows to visualize, for example, two physiologic parameters at the same time, wherein each parameter being allocated to a particular colour, and the ranges of the measures of the physiologic parameter are allocated to the intensity. If both parameters are present, this presence may be visualized as a mixed colour. The proportion of the measures of each of the physiologic parameters at a particular location may be visualized by the proportion of the mixed colours.

The physiologic data set may be obtained from a diagnostic imaging system like a computer tomography imaging system, a magneto-resonance imaging system, a functional magneto-resonance imaging system and the like. The functional magnetic resonance imaging is based on the use of a magneto-resonance image to measure the, for example, haemodynamic response related to a neural activity in the brain or spinal cord. In this case, the colour index may indicate the amount of neural activity. Perfusion data may also be presented as a colourised image, whereby the colour index may indicate a number of measures, for example, the blood volume, blood flow, mean transit time, average peak time, etc.

The physiologic parameter may be, for example, perfusion data of the anatomic structure, functional data of the anatomic structure, perfusion data of the environment of the anatomical structure, functional data of the environment of the anatomic structure and the like. It should be noted that the environment of the anatomic structure may also correspond to the anatomical region.

Figure 2:
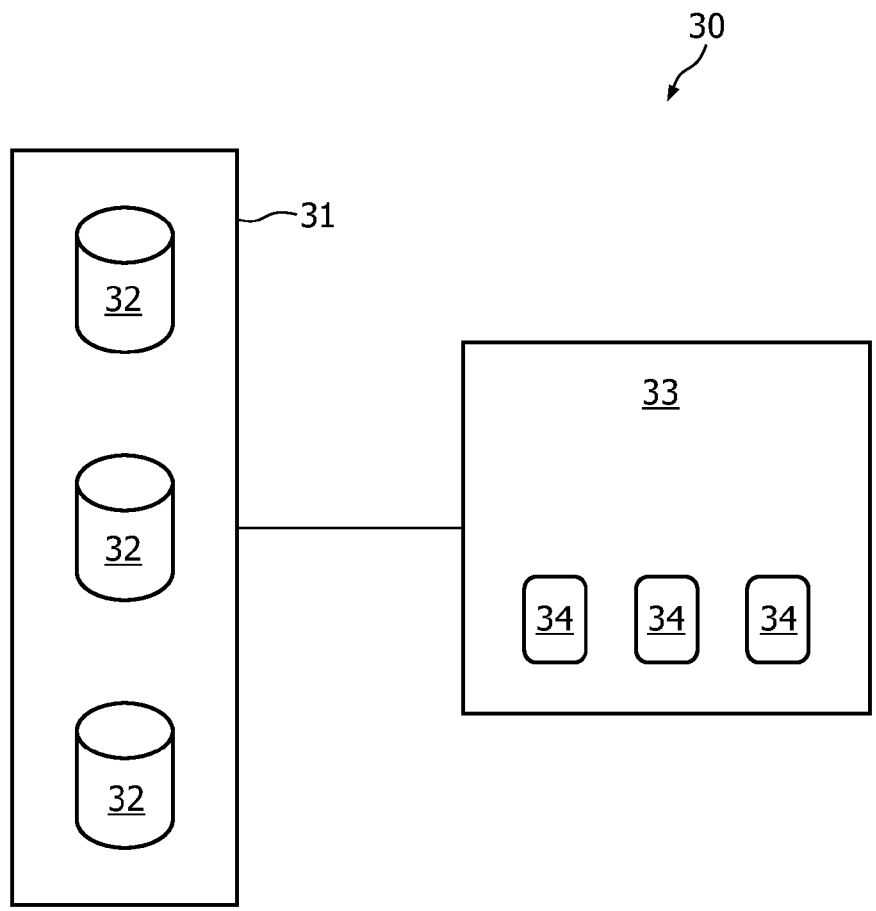
FIG. 2 describes the structure of the system according to an exemplary embodiment of the present invention.

FIG. 2 illustrates a system for registering an image comprising a computer storage unit 31 that includes one or more databases 32 and a processing unit 33 being in communication with a computer storage unit 31 and being programmed to generate the first image, to generate the second image and to register the first image and the second image corresponding to the above described method. The processing unit may further include one or more processors 34.

Figure 3:
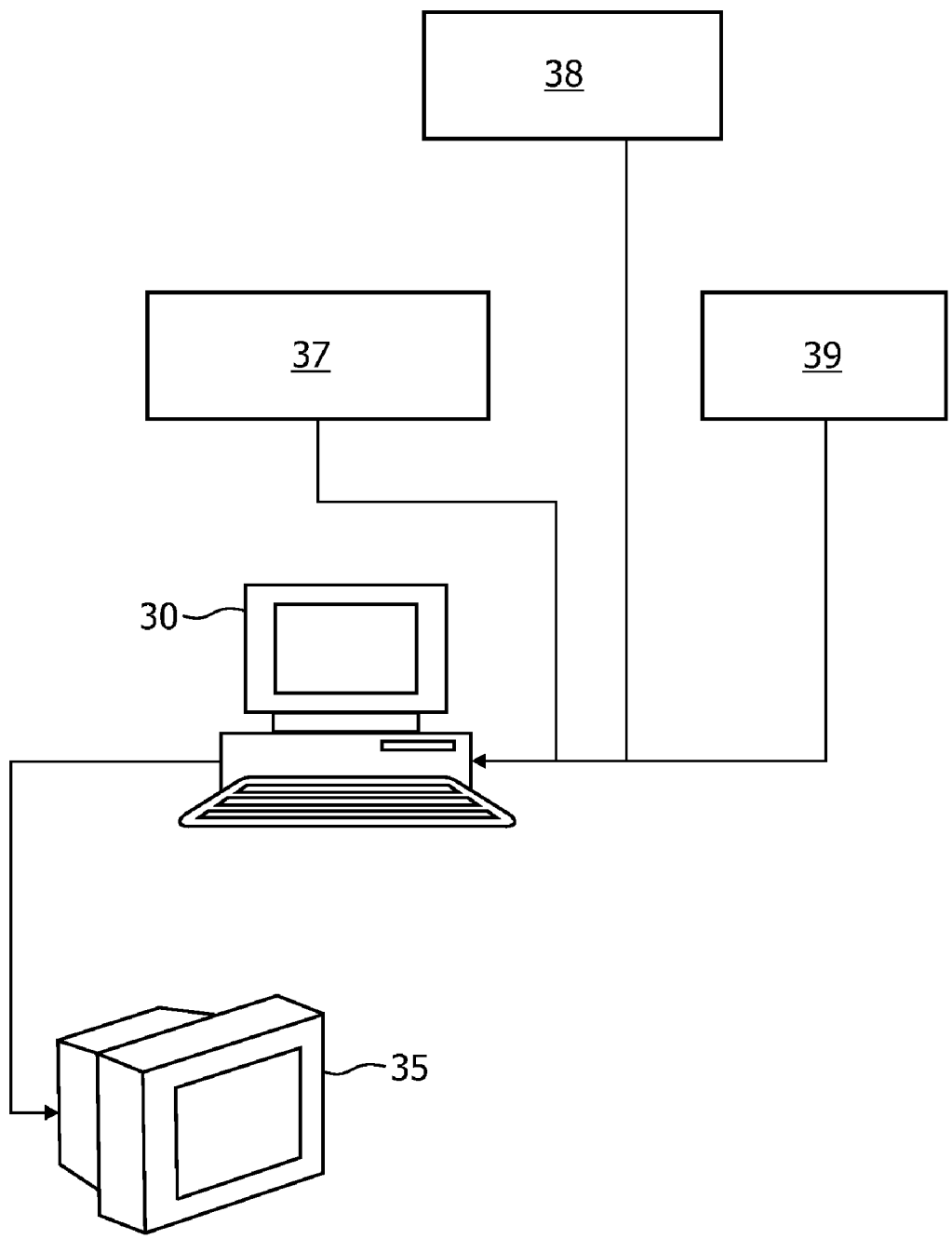
FIG. 3 shows the system, the data sources and an output medium of an exemplary embodiment of the present invention.

FIG. 3 illustrates the system 30 as described above, wherein the system obtains the data sets from external devices 37, 38, 39. A 3D rotational angiography data set may be provided, for example, by a 3D rotational angiography machine 38. The diagnostic data set may be provided by a diagnostic device, like a magneto-resonance imaging system or a computer tomography imaging system 37. The physiologic data set may be obtained by a device 39 being adapted to provide physiologic data, for example, a computer tomography imaging system, a magneto-resonance imaging system or a functional magneto-resonance imaging system, as described above. The system 30 may further comprise a displaying unit, however, it is also possible to provide an external displaying unit 35 to output the result of the registering and the output of the visualized registered images.

Figure 4:
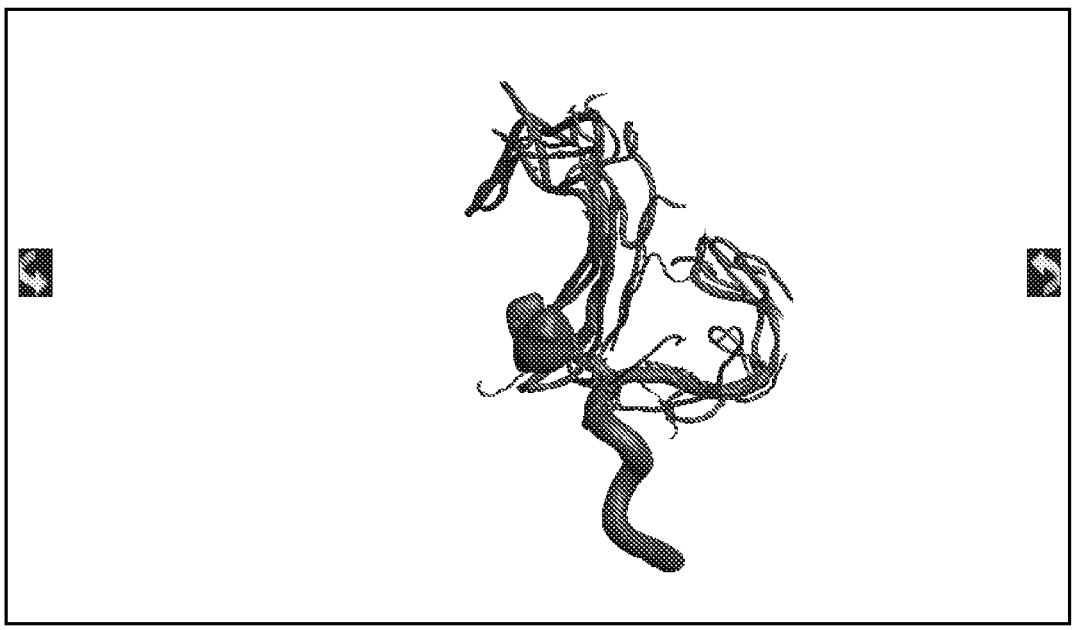
FIG. 4 shows an image of a segmented vessel generated from a 3DRA data set.
Figure 5:
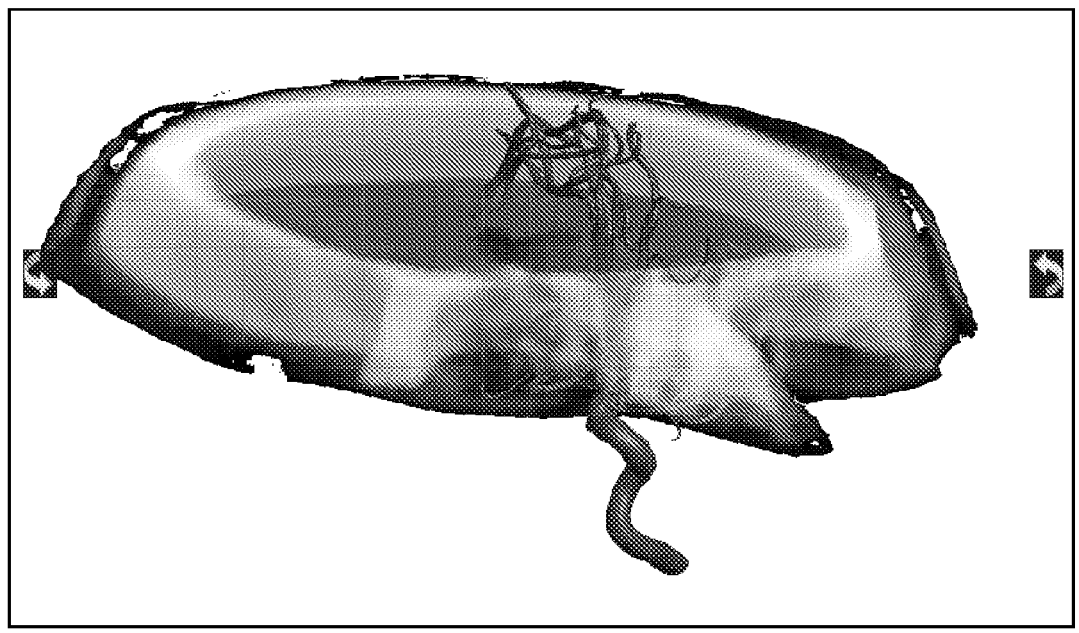
FIG. 5 shows an image of a segmented vessel generated from a 3DRA data set combined with a slab from an MR/CT data set.
Figure 6:
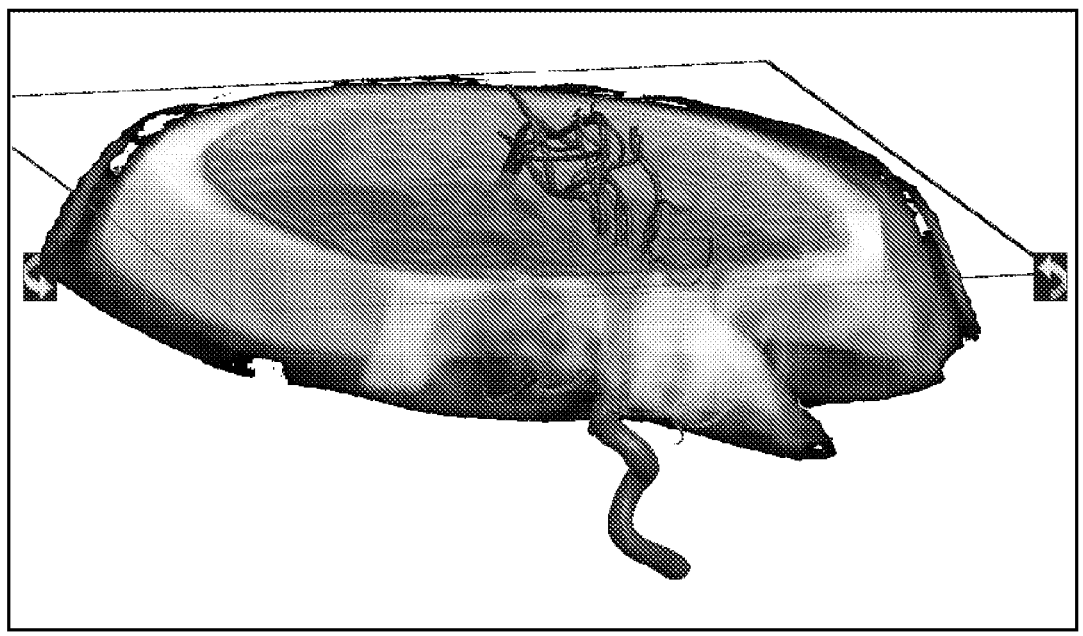
FIG. 6 is an image of a segmented vessel combined with a slab, wherein a slice of physiologic parameter visualization is located on top of the slab.

FIG. 4 to 6 illustrate particular steps to obtain a visualized image based on the registered images.

FIG. 4 shows a segmented vessel out of a 3DRA data set. Segmenting the vessel allows to exactly analyse the structure of the vessel, for example, in case of a stroke or an aneurism. However, the segmented vessel alone does not visualize the relative position of the vessel within an anatomical region. For this purpose, there is provided an image of an anatomical region. It should be noted that an image is not limited to two-dimensional data, but may also constitute three-dimensional data. Further, visualizing an image is not limited to a two-dimensional visualization, but may also comprise a three-dimensional visualization.

Although in the most displaying devices only two dimensions may be visualized, providing a three-dimensional image allows a plurality of additional impressions, when rotating the image so that the displaying device may visualize the image from different points of view.

FIG. 5 illustrates a slab of an anatomical region, wherein the image of the anatomical region and the image of the anatomical structure correspond to each other such that the segmented vessel is displayed in a correct position relative to the visualized anatomical region. Thus, it is possible to obtain an overview of the location and position of the segmented vessel with respect to anatomical items, for example, a bone, which is visualized here in a light colour.

FIG. 6 illustrates the combined structure of the anatomical structure and the segmented vessel together with an image of physiologic parameters, wherein the physiologic parameters are visualized as a slice on top of the slab of the anatomical region. It should be noted that the segmented vessel may also be visualized only with the slice of the physiologic parameter, i.e. without visualizing the slab of the anatomical region. Thus, it is possible to obtain an overview of the segmented vessel and physiologic parameters depending on the state and condition of the vessel, for example, perfusion data. In order to obtain an overview of the physiologic data like perfusion and the vessel in the human body, as a matter of fact providing a slab of the anatomic region, for example, of a human body, is useful for a more detailed interpretation of the state and condition of the object of interest.

It should be noted that the invention may be applied during minimal invasive interventional treatment of vascular pathologies and endovascular treatment of the neoplastic tissue so that it is of great clinical benefit to obtain morphologic assessment of the tissue inside and surrounding the vessel. In particular, the invention may be applied in treatment of ischemic strokes, stenosis, aneurisms and AVMs located in the head, the localisation of bleedings caused during minimal invasive procedures, and very localised radiotherapy of tumours etc, for a better orientation and understanding of the local anatomy.

It should be noted that the term 'comprising' does not exclude other elements or steps and the 'a' or 'an' does not exclude a plurality. Also elements described in association with the different embodiments may be combined.

It should be noted that the reference signs in the claims shall not be construed as limiting the scope of the claims.

The invention claimed is:

1. A method for registering an image, the method comprising:
   obtaining a 3D rotational angiography data set of an anatomical structure;
   obtaining a physiologic data set relating to a physiologic parameter with respect to the anatomical structure, the physiologic parameter being selected from the group consisting of perfusion data of the anatomical structure, functional data of the anatomical structure, environment perfusion data of the anatomical structure and environment functional data of the anatomical structure;
   generating a first image that includes the anatomical structure and is derived from the 3D rotational angiography data set;
   generating a second image that includes the physiologic parameter and is derived from the physiologic data set; and
   registering the first image and the second image.

2. The method of claim 1, further comprising:
   obtaining a diagnostic data set relating to an anatomical region;
   generating a third image that includes the anatomical region and is derived from the diagnostic data set; and
   registering the first image, the second image and the third image.

3. The method of claim 2, further comprising blending a slab of the third image and a portion of the first image using volume rendering.

4. The method of claim 1, further comprising segmenting the 3D rotational angiography data set.

5. The method of claim 4, further comprising generating a triangulated mesh from the segmented 3D rotational angiography data set, and carrying out a visualization.

6. The method of claim 5, wherein the visualization is carried out based on the segmented data set and the generated triangular mesh.

7. The method of claim 1, wherein the anatomical structure is a vessel, vessel tree or vasculature.

8. The method of claim 1, further comprising visualizing the registered images.

9. The method of claim 8, wherein the physiologic parameter is visualized as a slice in a visualized image.

10. The method of claim 9, further comprising obtaining a diagnostic data set relating to an anatomical region and generating a third image that includes the anatomical region and is derived from the diagnostic data set, wherein the slice is visualized on top of a slab of the third image.

11. The method of claim 1, wherein the physiologic parameter is visualized as a colorized image, wherein the colorized image indicates measures of the physiologic parameter by modifying a color and/or the intensity of a color.

12. The method of claim 1, wherein the physiologic data set is obtained from a diagnostic imaging system selected from the group consisting of a computer tomography imaging system, a magneto-resonance imaging system, and a functional magneto-resonance imaging system.

13. A processor programmed to carry out the method of claim 1.

14. A non-transitory computer readable medium having stored thereon a program element, which, when executed by a processor, is adapted to carry out the method of claim 1.

15. A system for registering an image, the system comprising:
   a computer storage unit that includes one or more databases; and
   a processing unit in communication with the computer storage unit and being programmed to:
      generate a first image that includes an anatomical structure of a patient and is derived from a 3D rotational angiography data set;
      generate a second image that includes a physiologic parameter and is derived from a physiologic data set, the physiological parameter indicating a metabolic activity of the patient; and
      register the first image and the second image.

16. The system of claim 15, wherein the processing unit is further programmed to:
  generate a third image that includes an anatomical region of the patient and is derived from a diagnostic data set; and
  register the first image, the second image and the third image.

17. The system of claim 16, wherein the processing unit is further programmed to:
  generate a visualization of the registered first, second, and third images in which the first image is visualized as a volume rendering, the second image is visualized as a plane, and the third image is visualized as a slab.

18. The system of claim 15, wherein the processing unit is further programmed to
  segment the 3D rotational angiography data set; and
  generate a triangulated mesh from the segmented 3D rotational angiography data set, and to carry out a visualization.

19. A method for registering an image, the method comprising:
  receiving a 3D rotational angiography data set from a region that includes vasculature;
  receiving a physiologic data set relating to a physiologic parameter, the physiologic parameter indicating a metabolic activity in the region;
  receiving a diagnostic data set indicating anatomical structure of the region;
  generating a first image that depicts at least a portion of the vasculature from the 3D rotational angiography data set;
  generating a second image that depicts the physiologic parameter from the physiologic data set;
  generating a third image that depicts the anatomical structure of the region from the diagnostic data set;
  registering the first image, the second image, and the third image; and
  visualizing the registered images, wherein the at least a portion of the vasculature is visualized as a volume rendering, the physiologic parameter is visualized as a slice in a visualized image, and the slice is visualized on top of a slab of the third image.

20. A system for registering images comprising:
  a processor programmed to perform the method of claim 19; and,
  a display device on which the registered images are displayed.

* * * * *